United States Patent [19]

Matteson

[11] Patent Number: 5,423,039

[45] Date of Patent: Jun. 6, 1995

[54] METHOD AND APPARATUS FOR IDENTIFYING WAIT STATES AND FOR PROVIDING A WAIT CURSOR IN A COMPUTER SYSTEM

[76] Inventor: Trey Matteson, 311 Everett Ave. #G, Palo Alto, Calif. 94301

[21] Appl. No.: 98,570

[22] Filed: Jul. 26, 1993

Related U.S. Application Data

[63] Continuation of Ser. No. 579,397, Sep. 6, 1990.

[51] Int. Cl.[6] .................... G06F 7/04; G06F 9/305; G06F 9/44
[52] U.S. Cl. .................... 395/650; 364/927.61; 364/947.2; 364/949.93
[58] Field of Search .................... 395/650, 700

[56] References Cited

U.S. PATENT DOCUMENTS

4,806,916  2/1989  Raskin et al. ............... 364/900
5,062,060  10/1991 Kolnick ....................... 364/521

Primary Examiner—Kevin A. Kriess
Assistant Examiner—John Q. Chavis
Attorney, Agent, or Firm—Hecker & Harriman

[57] ABSTRACT

A system for implementing a wait cursor at a system level. An event driver accepts user driven events, such as keyboard operations or mouse actions, time stamps them and provides them to a window server. The window server provides the event to an event queue of an associated program. This event is referred to as the "lastEventSent". The time stamp associated with that event remains with the event through each stage of execution. Each time a program completes execution of an event, the program notifies the window server of the time stamp of the event. This event is referred to as the "lastEventConsumed". The time stamp of the lastEventSent is compared to the time stamp of the lastEventConsumed. If the time stamp of the lastEventSent is not equal to the time stamp of the lastEventConsumed, the time stamp of the lastEventSent is compared to the currentTime. If the difference between the time stamp of the lastEventSent and the currentTime exceeds a threshold value, a wait cursor is implemented.

24 Claims, 8 Drawing Sheets

```
LastEventSent: E3T3(A)

LastEventConsumed: E1T1(A)

CtxtTimedOut: True

Time: T4
```

FIG. 3D

```
LastEventSent: E5T5(B)

LastEventConsumed: E0T0(B)

CtxtTimedOut: True

Time: T5
```

METHOD AND APPARATUS FOR IDENTIFYING WAIT STATES AND FOR PROVIDING A WAIT CURSOR IN A COMPUTER SYSTEM

This is a continuation of application Ser. No. 579,397 filed Sep. 6, 1990.

BACKGROUND OF THE INVENTION

1. Field of the Invention

This invention relates to the field of computer systems, and in particular to a method and apparatus for identifying wait states and providing a wait cursor during computer system operation.

2. Background Art

In a multi-tasking environment, a plurality of computer programs, such as application programs (hereinafter referred to as "programs"), can be used simultaneously by a computer user. Each program may have one or more associated windows into which its display data will be displayed on a display device, such as a video or liquid crystal display. A user may enter commands and interact with a program by manipulating data or images in a window, or by selecting operations from a menu associated with the window or associated program, using input devices such as a mouse, keyboard, joystick, cross-key, or the like. Such input devices may also operate as position translating devices, which can be used to position a graphical, on-screen pointer, such as a cursor. A cursor functions, for example, to indicate a character to be revised or to indicate a position where data is to be entered or an operation is to be performed. A cursor, in some form or appearance, is typically present on the computer display. Manipulation of an input device by a user will result in a corresponding movement of the cursor. Thus, for example, movement of a mouse results in movement of the cursor in the same direction.

A cursor may have different appearances depending on its function and the state of the computer system. For example, when positioned in a text field on a computer display, the cursor may have the appearance of an "I-beam", or a blinking vertical line. The position of the cursor in a text field indicates the location of the next character that will be entered by the user, typically via a keyboard. The cursor may have other appearances depending on its function. In a drawing or painting program, the cursor may be represented as a paint brush, pencil, eraser, bucket, or other graphic form.

The cursor may also take the shape of an arrow or pointer when positioned over user-selectable operations or when it is used to select graphical elements, such as windows. To select and activate a desired operation with the cursor, it may be positioned over a graphical or text representation of the operation. A button located on a mouse input device may be depressed and/or released to effectuate the operation. The user is notified of the acceptance of the operation for execution by visual feedback, usually in the form of some change in an image on the computer's display. This visual response is typically generated by one or more programs presently in use. These programs generate drawing commands to update the display images in response to the selected operations.

In certain circumstances, the provision of the visual response that indicates acceptance of a user command is delayed or prevented. For example, a user typically chooses one operation for execution by the computer, and then selects another operation. The first selected operation is often being executed when a user selects the subsequent operation. This creates a "wait state" during which the program, (and, thus, the display), does not provide any visual response to indicate acceptance of a command made during the execution of the "active" operation.

To inform the user that the computer is in a wait state, prior art programs often provide a mechanism to change the function and appearance of the cursor to a so-called "wait cursor". The wait cursor provides a visual cue to the user to indicate that the user cannot select or perform operations during the program wait state. When the wait state ends, the program converts the wait cursor to its non-wait state cursor appearance.

Prior art methods of providing a wait cursor are implemented at the program level. That is, each program includes instructions to determine when to provide and to generate a wait cursor. A program level wait cursor is not of suitable reliability in a multi-tasking environment, particularly in a system that uses virtual memory.

When a program is accessed, the code or instructions of that program must be resident in main memory. This main memory is typically random access memory (RAM) that stores the instructions to be executed by the processor of the computer system. In a virtual memory system, main memory is divided into "physical" and "secondary" memories. The physical memory is generally a dynamic random access memory (DRAM) and the secondary memory is generally a mass storage device, such as a hard disk. The combination of physical and secondary memory results in the availability of more main memory than can be provided with RAM alone.

In a virtual memory system, the program to be executed must be resident in physical memory before it can be executed. The program code associated with current program operations is likewise stored in physical memory. The code of other programs not presently running or being executed may be stored in secondary memory. During "application switching", that is, when the user switches from one program to another, if the code associated with the newly selected program is not resident in physical memory, it must be "paged in" from secondary memory and stored in physical memory.

Paging is a computer operation during which the user must be advised that a wait state exits, and that no further operations can be acknowledged or performed. Unfortunately, the program code that determines whether a wait cursor should be displayed, and which generates the wait cursor, is not resident in physical memory until the paging operation is concluded. As a result, a wait cursor cannot be provided until the paging operation is completed. The user will, therefore, not be informed that a wait state exists. In other words, the loading of a program results in a wait state and requires the display of a wait cursor, but the wait cursor cannot be displayed until the program responsible for generating the wait cursor is already loaded and executing.

There are other situations, in addition to program switching, during which the prior art fails to provide a suitable wait cursor. For example, the size of a program may be greater than can be stored in physical memory. Portions of the program code therefore must be stored in physical memory and the remainder in secondary memory. As program operations are performed, required code for these operations is paged in from secondary memory to physical memory. If the program code that implements the wait cursor is not resident in physical memory when a wait state exists, no wait cursor is provided and the user is not informed of the wait state.

Therefore, it is an object of the present invention to provide a method and apparatus for identifying wait states and providing a wait cursor that is independent of programs executing on a computer system.

It is another object of the present invention to provide a method and apparatus for identifying wait states and providing a wait cursor that can operate during paging operations.

SUMMARY OF THE INVENTION

The present invention provides a system for implementing a wait cursor during wait states. A user generates events or program processes using an input device such as a keyboard or mouse. These events and processes result in the generation of drawing commands by the program to change the display information, thus providing visual feedback of acceptance of the event. Each of the events generated is provided to a receiver and each event is tagged with a "time stamp" of theCurrentTime. A server distributes the events to appropriate programs for execution. The events are provided to event queues for sequential execution by the program.

The time stamp of the event most recently provided to the event queue, (the "lastEventSent") is stored as a variable in a memory. Each time a program completes the processing of an event, (the "lastEventConsumed"), the time stamp associated with this event is also stored in the memory. A first comparator compares the time stamps of the lastEventSent and the lastEventConsumed to determine a time difference. If the time stamps are not equal, a second comparator compares the time stamp of the lastEventSent with the current real time. If this time difference exceeds a threshold value, a wait cursor is generated and displayed.

The preferred embodiment of this invention is implemented in an operating system based on the UNIX® operating system developed by AT&T. Part of the UNIX operating system kernel is referred to as an "event driver". The event driver accepts user driven events, such as keyboard operations or mouse actions, and provides the events, with an associated time stamp, to a window server. The window server provides each event to an event queue of an associated program. The time stamp associated with that event remains with the event through each stage of execution.

Each time a program completes the processing of an event, the program notifies the window server of the time stamp of the event. At selected interrupts, the time stamp of the lastEventSent is compared to the time stamp of the lastEventConsumed. If the time stamps are not equal, the time stamp of lastEventSent is compared to theCurrentTime. If this difference exceeds a threshold value (e.g., 0.5 seconds), a wait cursor is provided to inform the user that a wait state exists. The wait cursor is maintained for a fixed time period.

Each time an application requests a new event, the window server compares the lastEventSent with the lastEventConsumed. If the lastEventConsumed has "caught up" with the lastEventSent, (that is, the time elapsed between the lastEventSent and the lastEventConsumed are equal) a flag is set to indicate that a wait state does not exist.

The event driver controls the comparison of the time stamp information in this invention. The lastEventSent and lastEventConsumed are stored in a memory shared by the event driver and window server. The event driver code is always resident in real memory so that the wait cursor can be implemented even during paging operations, preemptive scheduling, etc. Thus, the wait cursor can be implemented in a multi-tasking environment without loss of reliability.

DETAILED DESCRIPTION OF THE INVENTION

A method and apparatus for identifying wait states and providing a wait cursor is described. In the following description, numerous specific details, such as operating systems, memory types, etc., are set forth in detail in order to provide a more thorough description of the present invention. It will be apparent, however, to one skilled in the art, that the invention may be practiced without these specific details. In other instances, well known features have not been described in detail so as not to unnecessarily obscure the present invention.

In the preferred embodiment of this invention, programs are event driven. That is, a program is dormant until a user clicks on a mouse or keyboard, or otherwise initiates an event. The program receives that event and responds with a drawing to update the display. A window server generates the windowing environment of the system and acts as a "dispatcher" for events and routes them to the proper program. Each program has an associated DPSclient library that stores events in an event queue. The program receives the events one at a time, responds to the events and generates drawing commands as part of the response. The window server interprets the drawing commands and controls the drawing of the response on the display.

Figure 1:
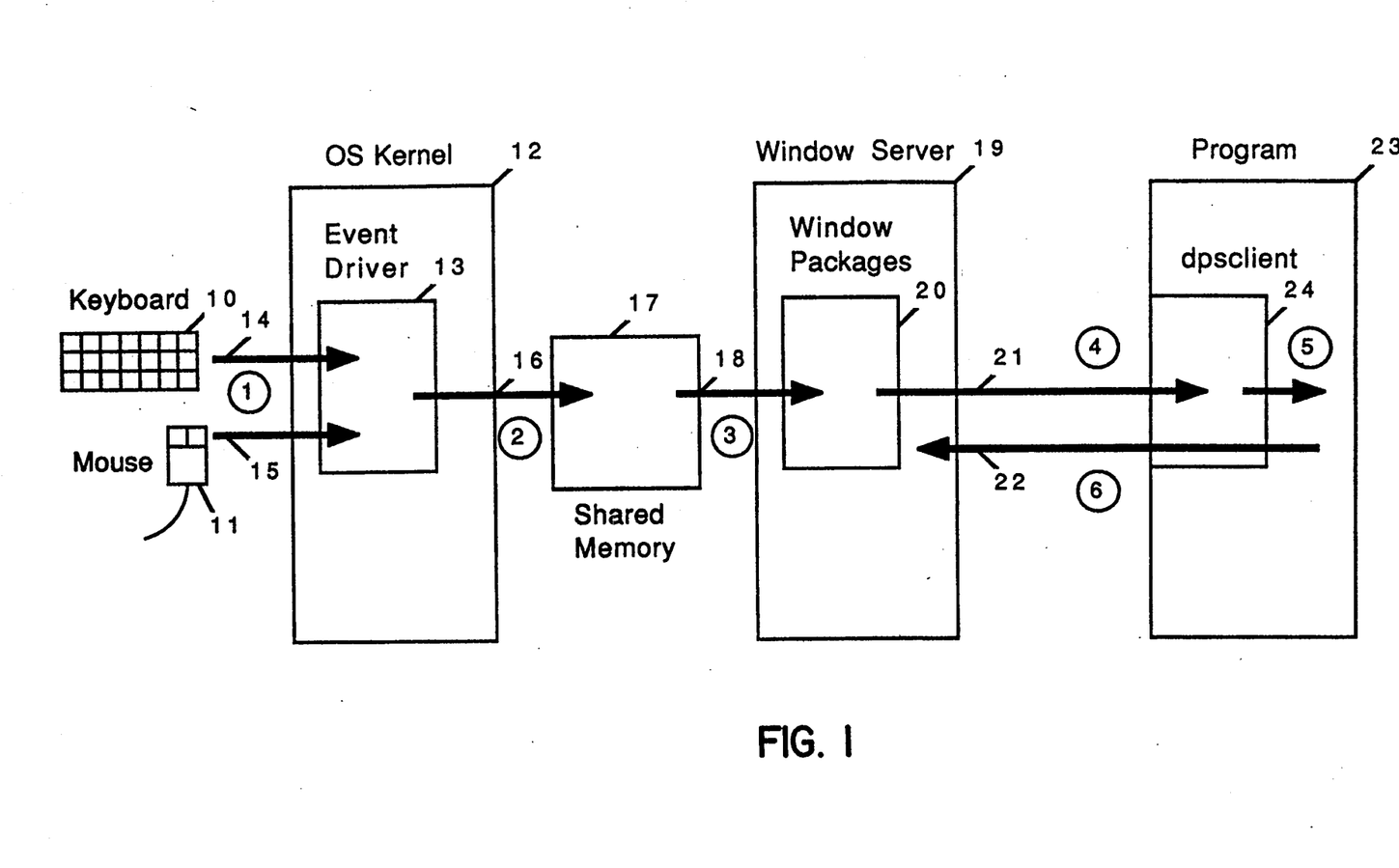
FIG. 1 is a block diagram illustrating event processing in the preferred embodiment of the present invention.

A block diagram of the computer system used in the preferred embodiment of this invention is illustrated in FIG. 1. A user interacts with a display using a keyboard 10 or mouse 11. Interaction of the keyboard 10 and mouse 11 generates events which are transmitted, on lines 14 and 155, respectively, to an operating system kernel 12. The operating system kernel 12 continuously resides in physical memory in the computer system of this invention. The OS kernel 12 includes an event driver 13. The event driver receives events such as keystrokes, mouse clicks, and/or other user input and provides these events to a shared memory 17 on line 16. The shared memory 17 is shared by the event driver 13 and a window server 19. The window server 19 reads the contents of the shared memory 17 on line 18 and provides them to a window packages block 20.

The window packages block 20 is a group of procedures that determine which program should receive a particular event. The window packages block 20 then provides that event to the appropriate program. For example, the window packages block 20 can communicate with program 23 on line 21. The window packages block 20 communicates with an event queue referred to here as DPSclient block 24. DPSclient block 24 enqueues events directed to the program. The DPSclient block 24 forwards the event to program block 23. Program block 23 responds to the event, resulting in an update to the display. This requires that the program provide display language codes, such as PostScript. This code is sent to the window server via DPSclient block 24 on line 22. After generating this code, the program requests more events from DPSclient block 24.

The preferred embodiment of the present invention is implemented in a UNIX-based operating system. Referring to FIG. 1, blocks 12, 19 and 23 represent UNIX processes and are implemented in software. In this invention, each event is comprised of a number of fields that identify the event. These fields are type, location, time, flags, window number, and event specific data. The type field identifies the type of event, such as mouse down, key up, right mouse key down, left mouse key down, etc. The location field contains the x and y coordinates of the cursor. The time field is the time stamp of this invention. The time stamp is represented by an incremental count of the number of vertical retrace interrupts that have occurred since the computer system was powered up. The flags field is used to indicate if certain control keys, such as the option key, shift key, alternate key, etc, are depressed when the event is created. The window number field identifies the screen display window and associated program that is the destination of the event. The event specific data field contains information that varies with event type and provides additional information about each type of event.

This data structure is given by way of example only. The invention can be practiced with other event data structures. In addition, the particular time stamp used is not required, and any suitable method for implementing a time stamp can be used without departing from the scope of this invention.

The present invention defines and utilizes several variables to determine when a wait state exists and so identify when a wait cursor should be implemented and displayed. These variables are referred to as "lastEventSent", "lastEventConsumed", "ctxtTimedOut" and "CurrentTime". LastEventSent is the time stamp of the last event sent to the currently active program. LastEventConsumed is the time stamp of the last event consumed by the currently active program. That is, the last event executed or operated by the active program. CtxtTimedOut identifies a program as "busy" (requiring a wait cursor) or not busy. CurrentTime is the current real time.

Each event provided to the window server 19 includes a time stamp indicating when that event was generated. When an event is provided from the window server 19 to the program 23, the variable "lastEventSent" is updated. LastEventSent is stored in shared memory 17 and is updated each time a new event is provided.

After the program has executed the event and provided a response 22 to the window server, the program requests a new event from the DPSclient block 24. When this occurs, DPSclient block 24 sends to the window server 19 the time stamp of the last event DPSclient block 24 provided to the program. This time stamp represents the "lastEventConsumed". The lastEventConsumed variable is also stored in shared memory 17. When the lastEventConsumed is updated, it is compared to lastEventSent. If they are equal, ctxtTimedOut is set to FALSE.

At selected timer interrupts, the time stamp of the lastEventSent and the lastEventConsumed are compared. If the time stamps of the lastEventConsumed and the lastEventSent are not equal, and the difference of the lastEventSent and the CurrentTime exceeds the threshold value, (e.g., 0.5 seconds) ctxtTimedOut is set TRUE. If ctxtTimedOut is TRUE, the shape of the cursor is changed to a wait cursor state (i.e., a spinning watch, rotating symbol, etc.) to inform the user that a wait state exists.

The wait cursor is maintained for a fixed time period (e.g., two seconds). In one embodiment of this invention, a count-down timer is enabled and initialized for the length of time the cursor is to be displayed. The countdown timer is decremented at each timer interrupt. Removal of the wait cursor is inhibited unless the count-down timer has reached zero, (or other setpoint), regardless of the results of the comparison of lastEventSent, lastEventConsumed and CurrentTime. However, comparisons of these variables continue at each timer interrupt, even during the fixed wait cursor display period. Although a count-down timer is used in this invention to implement the display of the wait cursor for fixed amount of time, any other suitable timing scheme can be utilized without departing from the scope of this invention. Alternatively, the present invention may be practiced without the use of a fixed wait cursor display period.

It should be noted that the drawing commands issued by the program can have a significant execution time. Therefore, the lastEventConsumed variable is not updated until completion of the drawing commands.

The present invention provides a system-based wait cursor because the code implementing the wait cursor is always resident in physical memory. In the preferred embodiment of the present invention, the code resides in the event driver (and the event driver is always resident in physical memory). However, any suitable code which resides in physical memory may be used. As part of the event driver, a procedure known as vertical retrace is executed at regular intervals (e.g., 68 milliseconds). The present invention takes advantage of the retrace interval to poll the shared memory and determine whether the wait cursor should be displayed by executing an algorithm. In this algorithm, CtxtTimedOut is a boolean expression that describes whether the active program has timed out (i.e. is busy) and therefore requires a wait cursor. LastEventSent, lastEventConsumed and ctxtTimedOut are variables in the shared memory 17. TheCurrentTime is theCurrentTime in the same units as the time stamps. WaitCursorThreshold is the amount of time a program must be busy before it requires a wait cursor. In the preferred embodiment, the algorithm executed by the event driver is as follows:

```
if ((lastEventSent != lastEventConsumed) &&
    (theCurrentTime - lastEventSent > waitCursorThreshold))
    ctxtTimedOut = TRUE;
```

```
-continued
if (ctxtTimedOut)
    /* PUT UP WAIT CURSOR */
else
    /* TAKE DOWN WAIT CURSOR */
```

The preferred embodiment of the present invention utilizes the vertical retrace interrupt to provide a regular and periodic execution of the wait cursor algorithm. Any suitable interrupt event, periodic timing or clocking can be utilized to initiate execution of the wait cursor algorithm. The wait cursor algorithm should be executed at a frequency sufficient to provide a wait cursor when required.

The window server executes an algorithm each time an application requests a new event. When this occurs, the lastEventConsumed variable in shared memory is updated and the following algorithm is executed:

```
if ((lastEventSent=lastEventConsumed)
    ctxtTimedOut=FALSE
```

Thus, once a wait cursor has been provided, it is not disabled unless the arguments of the event driver code are false, ctxtTimedOut is false, and the wait cursor display period has elapsed.

The present invention also provides a wait cursor in a multi-tasking environment and provides a wait cursor during application switching. In the prior art, when program code is used to provide a wait cursor, the wait cursor cannot be accessed during application switching when it is required.

In the present invention, each program has its own associated lastEventConsumed and lastEventSent information. The activation and deactivation of programs is controlled by the window packages block 20. As the window packages block 20 activates and deactivates programs, it informs the window server 19 of the context (lastEventSent, lastEventConsumed) of the currently active program. When the window server 19 is informed of a new active programs context, it stores that program's lastEventSent, lastEventConsumed and ctxtTimedOut into the shared memory 17. It accomplishes this by copying the values currently in the shared memory into the variables of the currently active context and copies the values of the context becoming active into the shared memory.

In some circumstances, a context has been deactivated but is busy, and thus eligible for a wait cursor. In the present invention, the vertical retrace is used to only check the context of the active program and so the context of a formerly active program will not be reviewed. The present invention provides the following algorithm for this situation (where "shMem" is shared memory):

```
shMem->ctxtTimedOut = ctxt->ctxtTimedOut ||
    ((ctxt->lastEventSent != ctxt->lastEventConsumed) &&
    (theCurrentTime - ctxt->lastEventSent >
        waitCursorThreshold))
```

When lastEventSent lastEventConsumed, and ctxtTimedOut are preceded by "shMem", this refers to the variables in the shared memory. When they are preceded by "ctxt", this refers to variables of the context becoming active.

Figure 2A:
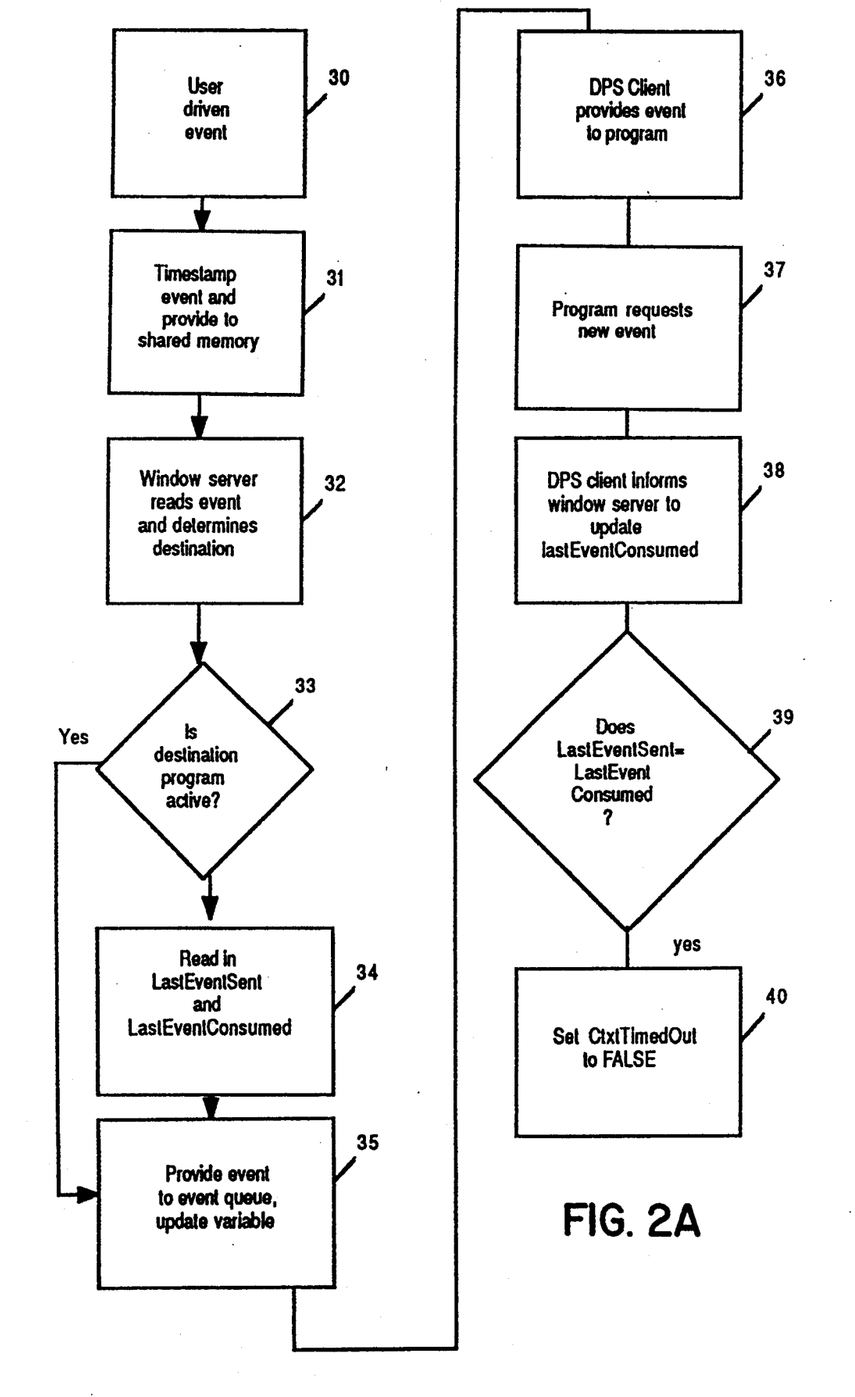
FIG. 2A is a flow diagram illustrating the operation of the present invention.

A flow diagram of the operation of the present invention is illustrated in FIG. 2A. At step 30, a user selects an event through a keystroke or cursor operation. At step 31, the event driver time stamps the event and provides the event to the shared memory. At step 32, the window server reads the event from the shared memory and determines the destination program.

At decision block 33, the argument "is the destination program active?" is made. If the destination program is not the currently active program, the system proceeds to step 34 and the lastEventSent and lastEventConsumed of the currently active program are switched with the lastEventSent and lastEventConsumed values of the selected program. If the destination program is the active program, the system proceeds to step 35 and the event is provided to the event queue of the program. At this point the last event variable in the shared memory is updated with the time stamp of the latest event.

At step 36, the DPSclient block provides that event to the program. At step 37, the program requests a new event. The DPSclient block informs the window server at step 38 to update the lastEventConsumed in the shared memory with the time stamp of the last event executed by the program.

Next, the window server compares lastEventSent with lastEventConsumed at decision block 39. If the time stamps of these events are equal, ctxtTimedOut is set to "false" at step 40.

Figure 2B:
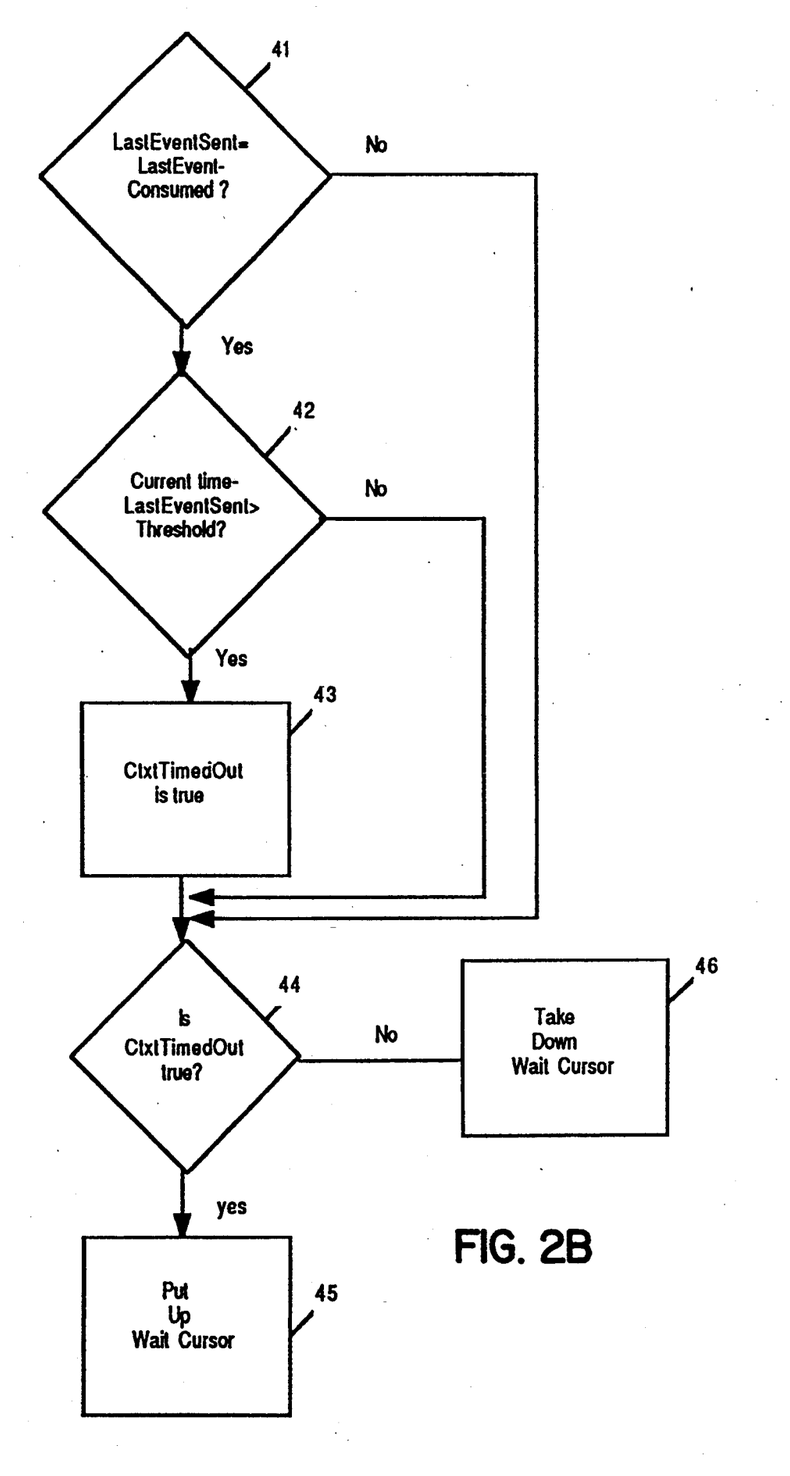
FIG. 2B is a flow diagram illustrating the event driver algorithm of this invention.

A flow diagram of the event driver algorithm, executed at vertical retrace intervals, is illustrated in FIG. 2B. During each vertical retrace interval, at step 41, the argument "Is lastEventSent=lastEventConsumed?" is made. If the argument is true, the system proceeds to decision block 42 and the argument "is current time-lastEventSent >waitCursorThreshold?" is made. If this argument is true, the system proceeds to step 43 and the ctxtTimedOut variable in the shared memory is set to true, indicating that a wait cursor is required, and the system proceeds to step 44. If either of the arguments at decision blocks 41 and 42 are false, the system proceeds to decision block 44.

At decision block 44, the argument "Is ctxtTimedOut true?" is made. If the argument is true, the system proceeds to step 45 and a wait cursor is generated. If the argument at decision block 44 is false, the system proceeds to step 46 and the wait cursor is removed. In the preferred embodiment, the wait cursor is removed only if the wait cursor display period has elapsed.

The threshold value in the preferred embodiment of the present invention is approximately one-half second. It has been determined that if an operation lasts at least one-half second, it is likely to require several seconds for execution, necessitating a wait cursor. In other words, the distribution of the timing of operations of most programs is not linear. There are a large number of operations that are executed in less than one-half second and a number of operations required greater than a half-second for execution.

Figure 4:
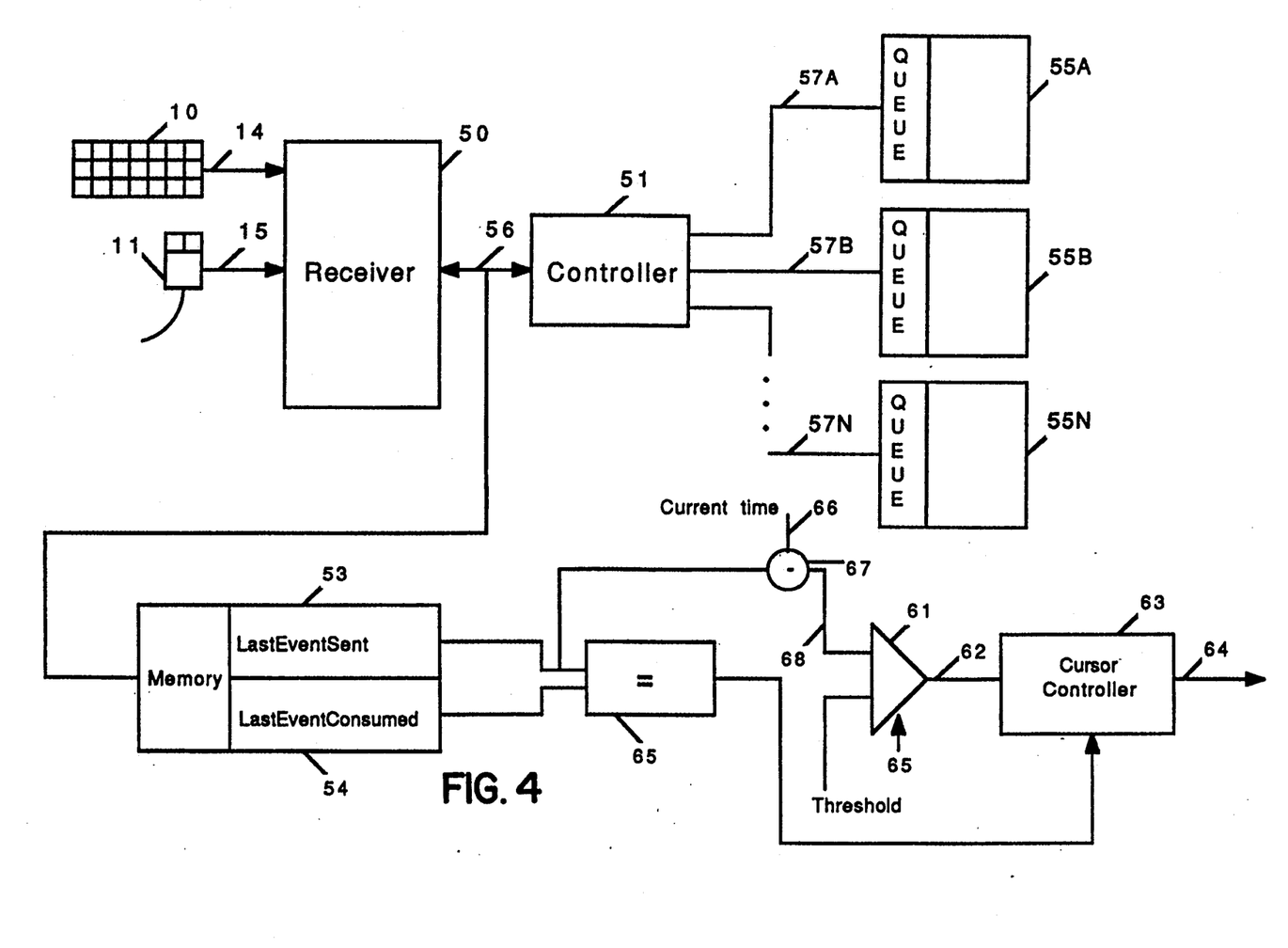
FIG. 4 is a block diagram of the present invention.

A block diagram of the present invention is illustrated in FIG. 4. The keyboard 10 and/or mouse 11 generate user driven events and provide these events to receiver 50 on lines 14 and 15 respectively. Receiver 50 provides a time stamp to each event and this time stamp remains with the event throughout the system.

The receiver 50 provides each event (with its associated time stamp) to a controller 51. Controller 51 determines the destination of each event and provides it, on one of lines 57A–57N to one of programs 55A–55N respectively. Each program has an associated event queue that operates as a FIFO buffer. Each time the controller provides an event to the event queue of a program, it updates memory 52 with the time stamp of that event. This time stamp is stored in memory 52 as lastEventSent 53. Each program has its own associated lastEventSent 53.

When a program has completed an event, it requests the next event from its event queue. The controller 51 tracks the time stamps of each event provided to the program and can determine the time stamp of the most recently executed event by counting the number of requests for events. When a new event is requested, the controller 51 updates the memory 52 with the time stamp of the most recently executed event as lastEventConsumed 54. Each program has its own associated lastEventConsumed 54.

The time stamp values associated with the lastEventSent 53 and lastEventConsumed 54 are coupled to equality comparator 58. Equality comparator 58 is under the control of an interrupt signal 65. When enabled, comparator 58 compares the time stamps of lastEventSent 53 and lastEventConsumed 54.

LastEventSent 53 is provided to subtractor 67 along with currentTime value 66. The difference between currentTime 66 and lastEventSent 53 is a difference value 68. The difference value 68 is provided to comparator 61 along with threshold value 60. The threshold value 60 may be a fixed value or it may be a user selectable value. In the preferred embodiment of this invention, it is user selectable. Comparator 61 is also controlled by interrupt signal 65. When enabled, comparator 61 generates an output 62 based on comparison of the difference value 68 and threshold value 60. This output 62 is provided to cursor controller 63.

If output 62 is positive, (difference 68 exceeds threshold 60), cursor controller generates a wait cursor and provides it to the display on line 64. If the output 62 is negative (difference 68 does not exceed threshold 60), the cursor controller disables the wait cursor. The cursor controller is not described in detail herein. Methods for generating display cursors of different appearances, including animated cursors, are well known in the art.

Figure 6:
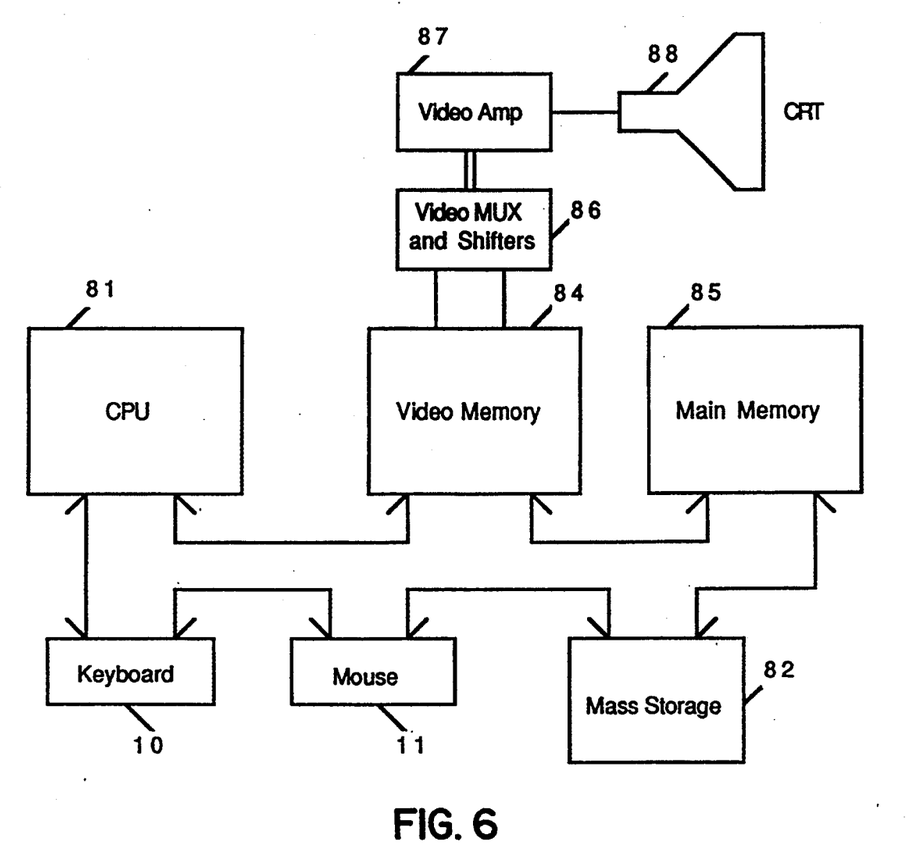
FIG. 6 is a block diagram of a hardware system for implementing this invention.

The present invention may be implemented on any conventional or general purpose computer system. An example of one embodiment of a computer system for implementing this invention is illustrated in FIG. 6. A keyboard 10 and mouse 11 are coupled to a bi-directional system bus 83. The keyboard and mouse are for introducing user input to the computer system and communicating that user input to CPU 81. The computer system of FIG. 6 also includes a video memory 84, main memory 85 and mass storage 82, all coupled to bi-directional system bus 83 along with keyboard 10, mouse 11 and CPU 81.

The mass storage 82 may include both fixed and removable media, such as magnetic, optical or magneto-optical storage systems or any other available mass storage technology. Bus 83 contains 32 address lines for addressing video memory 84 or main memory 85. The system bus 83 also includes a 32-bit data bus for transferring data between and among the components, such as CPU 81, main memory 85, video memory 84 and mass storage 82. Alternatively, multiplexed data/address lines may be used instead of separate data and address lines.

In the preferred embodiment of this invention, CPU 81 is a Motorola 68030 32-bit microprocessor, but any other suitable microprocessor or microcomputer may be used. The Motorola 68030 microprocessor and its instruction set, bus structure and control lines are described in *MC68030 Users' Manual*, published by Motorola, Inc., of Phoenix, Ariz.

Main memory 85 is comprised of dynamic random access memory (DRAM) and in the preferred embodiment of this invention, comprises 8 megabytes of memory. More or less memory may be used without departing from the scope of this invention. The video memory 84 is a dual ported video random access memory and in this invention consists of 256K bytes of memory. However, more or less video memory may be provided as well.

One port of the video memory 84 is coupled to video multiplexer and shifters 86 which in turn is coupled to video amplifier 87. The video amplifier 87 is used to drive cathode ray tube (CRT) raster monitor 88. Video multiplexing and shifter circuitry 86 and video amplifier 409 are well known in the art and may be implemented by any suitable means. This circuitry converts pixel data stored in video memory 84 to raster signals suitable for use by monitor 88. Monitor 88 is of a type of monitor suitable for displaying graphic images and in the preferred embodiment of this invention has a resolution of 1120 pixels wide by 832 pixels high. Other resolution monitors may be utilized in this invention.

In operation, the event driver and window server are instruction sets which are stored in main memory and executed by CPU 81. One or more programs are stored in mass storage and paged into main memory as needed for access and execution by the CPU 81. The shared memory is a subset of main memory 85.

Figure 3A:
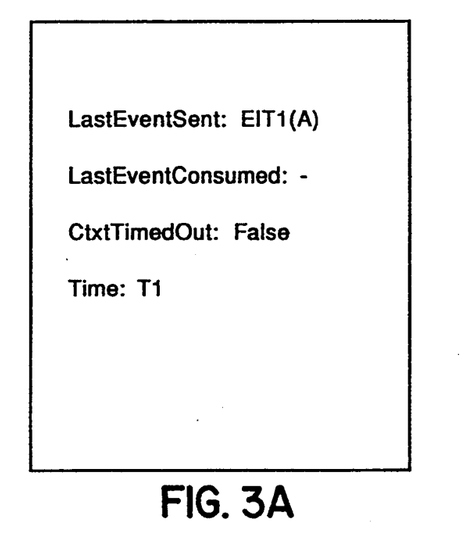
FIGS. 3A-3E illustrate the memory contents of selected variables during operation of the invention.

The values of lastEventSent, lastEventConsumed, ctxtTimedOut and the state of the wait cursor at various times T1-T5 are illustrated in FIGS. 3A-3E. Referring first to FIG. 3A, at time T1 an event (referred to as event "E1") E1 is provided to the program event queue. This event E1 is directed to program A and is time stamped time T1. Therefore, the value of lastEventSent in the shared memory 17 is E1T1(A). At this point, there is no lastEventConsumed for the program and so the ctxtTimedOut value is false. The wait cursor is disabled.

Figure 3B:
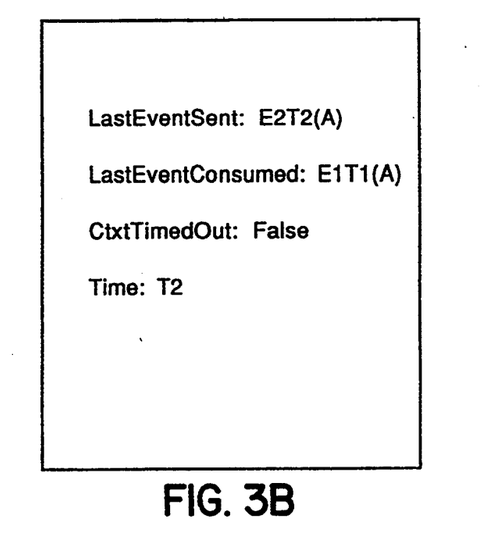

FIG. 3B illustrates the shared memory 17 at time T2. At time T2, a second event E2 is provided to program A and the lastEventSent variable in shared memory 17 is updated to the new value E2T2(A). In addition, the first event E1 has been executed so the lastEventConsumed value is E1T1(A). A comparison is done between the lastEventSent and the lastEventConsumed. The time time stamps are not equal, so lastEventSent is compared to current time.

Figure 3C:
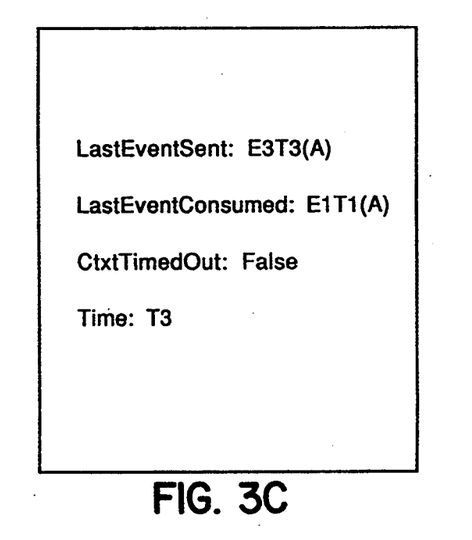

At time T3, a new event is sent to the event queue. The lastEventSent value is updated to E3T3(A). Event E2 has not yet been completed, so the lastEventConsumed value remains E1T1(A). The time stamp of the lastEventSent (T3) is not equal to the time stamp of the lastEventConsumed (T1). Therefore, the time stamp of the lastEventSent (T3) is compared to theCurrentTime, also T3. Since this difference is zero, the ctxtTimedOut variable is false.

Figure 3D:
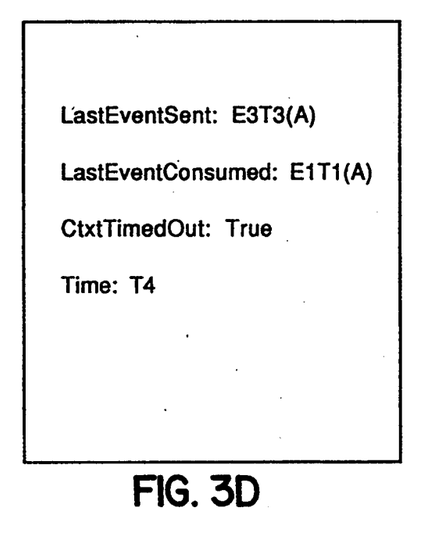

At time T4, illustrated in FIG. 3D, the program is still executing event E2 and no new events have been sent. The lastEventSent remains E3T3 and the lastEventConsumed is E1T1. The time stamp of these variables is not equal. The currentTime (T4) is compared to the time of the lastEventSent (T3). This difference exceeds the threshold level and so the ctxtTimedOut value is true and a wait cursor is implemented.

Figure 3E:
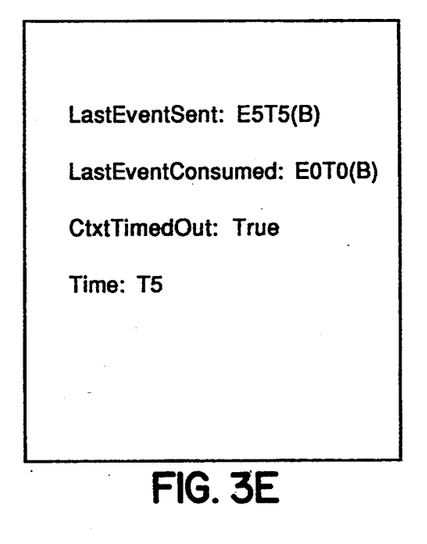

At time T5, illustrated in FIG. 3E, event E5 is provided to program B. Therefore, the lastEventSent and lastEventConsumed in shared memory 17 (currently values for program A) must be switched with the existing values for program B. In this case, lastEventSent becomes E0T0(B) and the lastEventConsumed for program B is E0T0(B). The time stamp of the lastEventSent (T0) and the lastEventConsumed (T0) are equal. Therefore, a wait cursor is not implemented.

In the preferred embodiment of this invention, the time stamps of the lastEventSent and lastEventConsumed are stored in shared memory 17. In alternate embodiments of this invention, the time stamps of all events, even those that have not yet been consumed, are stored in shared memory.

Although the present invention has been described in terms of identification of wait states to determine the necessity of implementing a wait cursor, the invention is not limited to this application. The present invention provides a method and apparatus for using time stamps to track events that are provided to programs of a computer system and having the time stamps returned after the program processes those events. This allows the events to be traced through the computer system, from the creation of the event, through the dispatching of the event to a program, and after the event has been processed by the program.

Thus, the present invention provides a means to obtain time related information about events in a computer system and to make decisions based on the time related information. For example, the time stamp information of events can be used for performance monitoring of programs and computer systems.

This invention can also be applied to a method for controlling a virtual memory paging system. In one implementation, the event driver monitors ctxtTimedOut to determine if programs are busy processing events, that is, if the computer is in a wait state. If so, paging operations are inhibited if possible during these wait states. Paging operations can have significant effects on system performance, and the present invention provides a method to defer paging operations to a time when the system is not executing user operations.

Each context or program maintains a list of time stamps representing an ordered list of all events sent to that context and which have not yet been acknowledged. The first event from the ordered list of the active context is stored in the shared memory. A special "sentinel" value (for example, −1), is used to indicate that the context has no outstanding events. In this embodiment, lastEventConsumed and context busy flags are not utilized. However, a lastEventSent variable is maintained in the shared memory.

Figure 5:
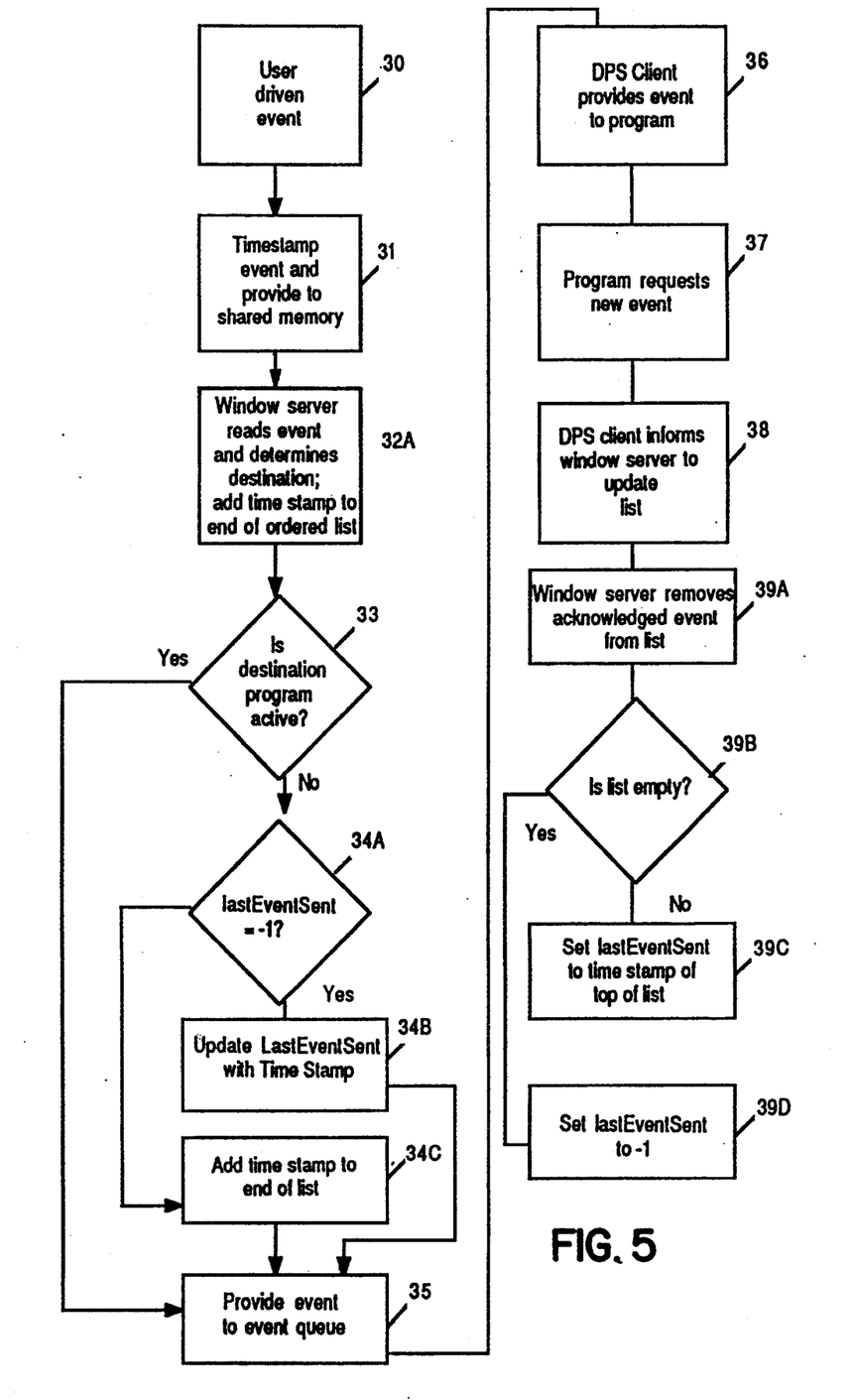
FIG. 5 is a flow diagram illustrating the operation of an alternate embodiment of this invention.

FIG. 5 illustrates the operation of the invention in this alternate embodiment. FIG. 5 is similar to FIG. 2A and like element numbers have been used on like steps. Following step 31, at step 32A, the window server reads the event and determines the destination program. The window server then adds the time stamp of this event to the end of the ordered list associated with the destination program. At decision block 33, it is determined if the destination program is active. If the destination program is not active, the lastEventSent for that program is read. At decision block 34A, if the lastEventSent is equal to −1 (meaning that the list is empty), the lastEventSent variable is updated with the time stamp of this event. If the lastEventSent is not equal to −1 at decision block 34A, the system proceeds to step 34C, the lastEventSent value for the program is read in from shared memory, and the time stamp of the current event is added to the end of the ordered list for that program. Steps 34B and 34C then proceed to step 35.

At step 35, the event is provided to the event queue of the destination program. At step 36, the DPS client block provides the event to the destination program. At step 37, the program requests a new event. At step 38, the DPS client informs the window server to update the list of the program. At step 39A, the window server removes the acknowledged event from the top of the ordered list of that program. At decision block 39B, it is determined if the list is empty. If the list is not empty, the lastEventSent is set to the time stamp of the next entry on the list at step 39C. If the list is empty, the lastEventSent variable is set to −1 at step 39D.

In this embodiment, the event driver utilizes the following code to determine if a wait cursor is required:

```
if (LastEventSent != −1 &&
    theCurrentTime - LastEventSent > waitCursorThreshold)
    /* PUT UP WAIT CURSOR */
else
    /* TAKE DOWN WAIT CURSOR */
```

Thus, if the lastEventSent is not equal to −1, and the difference between theCurrentTime and the lastEventSent is greater than the waitCursorThreshold, a wait cursor is implemented. Otherwise, the wait cursor is removed.

Thus, a method and apparatus for implementing a wait cursor has been described.

I claim:

1. A method for identifying a wait state of a computer system comprising the steps of:

running in said computer system at least one program for executing events;

generating in a receiver a time stamp for each of said events at the time of generation of each of said events;

setting a first variable in memory means to be a time stamp of the most recently generated event;

setting a second variable in said memory means to be a time stamp of the most recently executed event;

comparing in a first comparing means said first variable with said second variable at selected times;

comparing said first variable with the current time when said first variable is not equal to said second variable and generating in a subtractor a difference value between said first variable and said current time; and, identifying via a second comparing means a wait state when said difference value exceeds a threshold value;

displaying for a first time period a cursor of a first type on a display associated with said computer system when said wait state is identified.

2. The method of claim 1 further including the steps of:

generating said difference value after expiration of said first time period;

displaying a cursor of a second type on said display when said difference does not exceed said threshold value; and, cursor control means maintaining said cursor of said first type on said display when said difference exceeds said threshold value.

3. The method of claim 1 wherein said events are events that generate drawing commands to a display associated with said computer system.

4. The method of claim 1 wherein said step of comparing said first variable with said second variable is performed at a timer interrupt.

5. The method of claim 4 wherein said timer interrupt is a vertical retrace interrupt.

6. A computer system comprising:
event generating means for generating a plurality of events;
receiving means coupled to said event generating means for receiving said events and for generating a time stamp for each of said plurality of events;
control means coupled to said receiving means for receiving said events and for providing said events to an execution means for sequential execution;
memory means coupled to said receiving means and said control means for storing a first variable having a value equal to a time stamp of the most recent event provided to said execution mean and a second variable having a value equal to a time stamp of the most recent event executed by said execution means;
first comparing means coupled to said memory means for comparing said first variable with the current time when said first variable does not equal said second variable, said first comparing means generating a difference value;
second comparing means coupled to said first comparing means for comparing said difference value to a threshold value; and,
cursor control means for selecting a first cursor on a display of said computer system when said difference value from said second comparing means exceeds said threshold and for selecting a second cursor when said difference from said second comparing means value does not exceed said threshold.

7. The computer system of claim 6 wherein said event generating means comprises a keyboard.

8. The computer system of claim 6 wherein said event generating means comprises a mouse.

9. The computer system of claim 6 wherein said execution means comprises a microprocessor.

10. The computer system of claim 6 wherein said receiving means, control means, first comparing means, second comparing means and said cursor control means are implemented as a plurality of processor executable instructions.

11. The computer system of claim 6 further including a timer interrupt means coupled to said first and second comparing means for controlling the frequency of operation of said first and second comparing means.

12. A method of identifying a wait state of a computer system comprising the steps of:
generating in said computer system a plurality of events;
generating in said receiver a time stamp for each of said events at the time of generation of each of said events;
a controller sequentially providing each of said events to an event queue for execution by a program;
said controller setting the value of a first variable in a memory means to be the time stamp of the event most recently provided to said event queue;
said controller setting the value of a second variable in said memory means to be the time stamp of the event most recently executed by said program;
comparing in a first comparing means said first variable with said second variable at selected times;
comparing said first variable with the current time when said first variable is not equal to said second variable and generating in a subtractor a difference value;
identifying via a second comparing means a wait state when said difference value exceeds a threshold value;
displaying for a first time period a first cursor on a display associated with said computer system when said wait state is identified.

13. The method of claim 12 further including the steps of:
comparing said first and second variables after expiration of said first time period;
comparing said first variable and the current time when said first variable is not equal to said second variable and generating said difference value;
displaying a second cursor on said display when said difference value does not exceed said threshold value; and,
maintaining said first cursor when said difference exceeds said threshold value.

14. The method of claim 12 wherein said events are events that generate drawing commands to a display associated with said computer system.

15. The method of claim 12 wherein said step of comparing said first variable with said second variable is performed at a timer interrupt.

16. The method of claim 15 wherein said timer interrupt is a vertical retrace interrupt.

17. A method for monitoring events in a computer system comprising the steps of:
running in said computer system at least one program for executing said events;
generating in a receiver a time stamp for each of said events at the time of generation of each of said events;
generating an ordered list of variables in a memory means and associating each of said events with a variable in said memory means;
setting each variable in said memory means to be a time stamp of the event associated with said variable such that the first variable in said ordered list is a time stamp of the most recently created event and the last variable is a time stamp of the most recently executed event;
comparing said first variable with the current time when said first variable does not equal said second variable and generating a difference value between said first variable and said current time;
identifying a wait state when said difference value exceeds a threshold value;
displaying for a first time period a cursor of a first type on a display associated with said computer system when said wait state is identified.

18. The method of claim 17 further including the steps of:
generating said difference value after expiration of said first time period;

displaying a cursor of a second type on said display when said difference does not exceed said threshold value; and, cursor control means maintaining said cursor of said first type on said display when said difference exceeds said threshold value.

19. The method of claim 18 wherein said events are events that generate drawing commands to a display associated with said computer system.

20. The method of claim 19 wherein said step of comparing said first variable with said last variable is performed at a timer interrupt.

21. The method of claim 20 wherein said timer interrupt is a vertical retrace interrupt.

22. A method for monitoring events in a computer system comprising the steps of:

in a receiver generating a time stamp for each of said events at the time of generation of each of said events;

in a controller determining a destination user of each of said events;

said controller recording a time stamp of a subset of said events when said events are provided to said destination user;

processing each of said events by said destination user and generating an acknowledgment of completion of said processing;

said controller recording the time stamps of said subset of events associated with said acknowledgments;

generating a difference value between the current time and the time stamp of a most recent event provided to a destination user and executing an operation when said difference value exceeds a threshold value;

said operation comprising identifying a wait state when said difference value exceeds a threshold value;

displaying for a first time period a cursor of a first type on a display associated with said computer system when said wait state is identified.

23. The method of claim 22 wherein said subset of said events comprises all of said events.

24. The method of claim 22 further including the steps of:

generating said difference value after expiration of said first time period;

displaying a cursor of a second type on said display when said difference does not exceed said threshold value; and cursor control means maintaining said cursor of said first type on said display when said difference exceeds said threshold value.

* * * * *

UNITED STATES PATENT AND TRADEMARK OFFICE
CERTIFICATE OF CORRECTION

PATENT NO. : 5,423,039
DATED : June 6, 1995
INVENTOR(S) : MATTESON, Trey

It is certified that error appears in the above-indentified patent and that said Letters Patent is hereby corrected as shown below:

On the title page, please add:

--[73] Assignee: NeXT, Inc., Redwood City, California.

Signed and Sealed this

Thirtieth Day of April, 1996

Attest:

BRUCE LEHMAN

Attesting Officer

Commissioner of Patents and Trademarks